United States Patent
Bunge

(10) Patent No.: US 12,276,254 B2
(45) Date of Patent: Apr. 15, 2025

(54) MASS BALANCING OF WIND TURBINES

(71) Applicant: Steffen Bunge, Pinawa (CA)

(72) Inventor: Steffen Bunge, Pinawa (CA)

( * ) Notice: Subject to any disclaimer, the term of this patent is extended or adjusted under 35 U.S.C. 154(b) by 0 days.

(21) Appl. No.: 18/625,806

(22) Filed: Apr. 3, 2024

(65) Prior Publication Data
US 2024/0344503 A1   Oct. 17, 2024

Related U.S. Application Data

(60) Provisional application No. 63/496,156, filed on Apr. 14, 2023.

(51) Int. Cl.
*F03D 13/35* (2016.01)
*F03D 7/02* (2006.01)

(52) U.S. Cl.
CPC ............... *F03D 13/35* (2016.05); *F03D 7/02* (2013.01); *F03D 7/0224* (2013.01); *F05D 2260/15* (2013.01)

(58) Field of Classification Search
CPC ........... F03D 13/35; F03D 7/02; F03D 7/0224
See application file for complete search history.

(56) References Cited

U.S. PATENT DOCUMENTS

| | | | |
|---|---|---|---|
| 5,219,454 A * | 6/1993 | Class | F16F 15/322 73/458 |
| 7,780,417 B2 * | 8/2010 | Kirchner | F03D 1/0658 416/207 |
| 9,353,729 B2 * | 5/2016 | Wilson | F03D 1/0691 |
| 9,567,973 B2 * | 2/2017 | Pasquet | F03D 1/0658 |
| 11,428,202 B2 * | 8/2022 | Ejlersen | F03D 1/0633 |
| 2012/0134825 A1 * | 5/2012 | Grabau | F03D 7/0228 29/889.7 |
| 2015/0167632 A1 * | 6/2015 | Gil | F03D 80/50 29/889 |

* cited by examiner

*Primary Examiner* — Woody A Lee, Jr.
*Assistant Examiner* — Behnoush Haghighian
(74) *Attorney, Agent, or Firm* — Adrian D. Battison; Ade & Company Inc.; Kyle R. Satterthwaite

(57) ABSTRACT

In a method for balancing a wind turbine where a plurality of blades are mounted on a rotor hub an annular blade bearing which allows the blade to pivot, in response to a detection of an imbalance caused by unbalanced loads applied by the blades weight is added to one or more of the blades to counter the imbalance. The weight is added by mounting a weight body to the blade at the blade bearing. The weight body comprises a plurality of individual arcuate weight elements in a stack attached to the outer race of the bearing a plurality of brackets, each engaged onto a selected one of the screw fasteners connecting the bearing to the hub. Each bracket includes a collar engaged onto a selected one of the screw fasteners and a post forming the engagement portion onto which the weight body is engaged.

18 Claims, 8 Drawing Sheets

MASS BALANCING OF WIND TURBINES

This application claims the benefit under 35 USC 119 ( ) of Provisional application 63/496,156 filed Apr. 14 2023.

This invention relates to a method for balancing wind turbines by adding weight at one or more of the blades to counter a mass imbalance about the rotation axis of the rotor.

A wind turbine of the construction concerned typically comprises:
- a rotor hub mounted on a nacelle for rotation about a generally horizontal axis; and
- a plurality of blades mounted on the rotor hub for driving the rotation of the rotor hub in response to wind impacting on the blades;
- where each blade is mounted on the rotor hub by an annular blade bearing which allows the blade to pivot about a longitudinal axis of the blade relative to the hub to change pitch of the blade as required for wind conditions.

BACKGROUND OF THE INVENTION

When a mass unbalance is detected on a wind turbines rotor, balancing measure weights will have to be added to one or more blades. This typically happens in one of the following ways.
- —a— Adding weight by injecting a balancing resin into the blade,
- —b— filling pre-designed balancing boxes (chambers) with a mix of resin and weight particulates,
- —c— by weight blocks inserted and glued into the center spar. This can be done if there is no balancing chamber (see b above) or if it is already filled All three options require the right atmospheric conditions such as precipitation, temperature, and humidity, to ensure the application. Especially for the first two, a crane or bucket crane is required, coming with its own set of availability, costs and necessary weather conditions. Especially in offshore applications, the inaccessibility raises further issues.

All three options are also non-removable. Depending on the blade's age or the application's general quality, the bonding might break, and the mass balancing material becomes loose, damaging the blade or accumulating in undesirable locations creating new unbalances. The application of resin either to introduce material or to re-seal openings necessary to introduce material or even types of cement and glues used to fixate weight blocks might not be possible in an effective manner since the structure of the blade might be compromised with hydraulic fluids or fine dust preventing the resin to bond with the existing structure properly.

The issue of a permanent placement has two other problems. If, for whatever reason, mass balancing was placed in the wrong location or the wrong amount, the rotor might be left in a state where correction is not possible anymore. Removing of that weight is typically a significant interference with the blade's structure and is generally not desired or possible.

It is also possible that the mass unbalance found is not of a permanent nature so that it may later be required to be removed and this may be impossible with the above techniques.

Especially in wind turbines where the pitch system is hydraulic, it is often the case that liquid enters the blade due to leaks. It is known that substantial amounts of hydraulic fluids can accumulate in the blade's structure. However, this amount can change over time, especially in hot climates. Hydraulic fluid might get "cooked out" of the structure of the blade again. If a turbine was balanced before, it now ends up in a new state of mass unbalance, and the original mass balancing means would have to be removed.

Turbines exposed to wet or humid environments also can accumulate water in the blade's structure over time.

In any case, inserting weights can weaken or stiffen the blade's structure and de-tune the blade's natural frequencies. This could have a variety of consequences for the safe operation of the turbine.

SUMMARY OF THE INVENTION

According to the invention there is provided a method for balancing a wind turbine of the above type comprising:
- in response to a detection of an imbalance in the rotation of the rotor hub caused by unbalanced loads applied by the blades to the rotor hub, adding weight to one or more of the blades to counter the imbalance, where the weight is added to said one or more blades by mounting a weight body at the blade bearing.

Preferably the weight body comprises a plurality of individual weight elements so that the number of weight elements can be selected to provide a total required weight.

Preferably the blade bearing includes an outer race attached to the hub and an inner race attached to the blade where the weight body is mounted on the outer race so as to remain attached to the hub so that the weight body does not pivot with the blade when pitch changes are introduced.

Preferably the blade bearing includes an outer race which is connected to the rotor hub by a plurality of screw fasteners and the weight body is mounted using the screw fasteners.

Preferably the weight body is mounted on the screw fasteners by a plurality of brackets, each engaged onto a selected one of the screw fasteners and each including an engagement portion for mounting the weight body.

Preferably each bracket includes a collar engaged onto a selected one of the screw fasteners and a post forming the engagement portion onto which the weight body is engaged.

Preferably the weight body comprises a plurality of plates where each plate has holes therein allowing the plates to slide onto the post in a stack of plates.

Preferably the engagement portions for mounting the weight body are located outward of the outer race.

Preferably the posts for mounting the weight body extend axially of the blade.

Preferably the weight body extends around only part of the circumference of the blade leaving at least a part of the circumference of the blade bearing at the nacelle free from the weight body.

Preferably the weight body is formed in two separate components each extending around only part of the circumference of the blade at the leading and trailing edges of the blade.

The present invention thus utilizes the existing studs for mounting the blade bearing to the hub body.

This arrangement herein uses prefabricated metal parts mounted on the blade bearing bolts, which are attached to the hub body. This allows for a quick weather-independent and adjustable mass balancing measure. Many turbines do have identical hub dimensions and therefore, prefabricated parts could be used on a variety of turbines.

DETAILED DESCRIPTION

Figure 1:
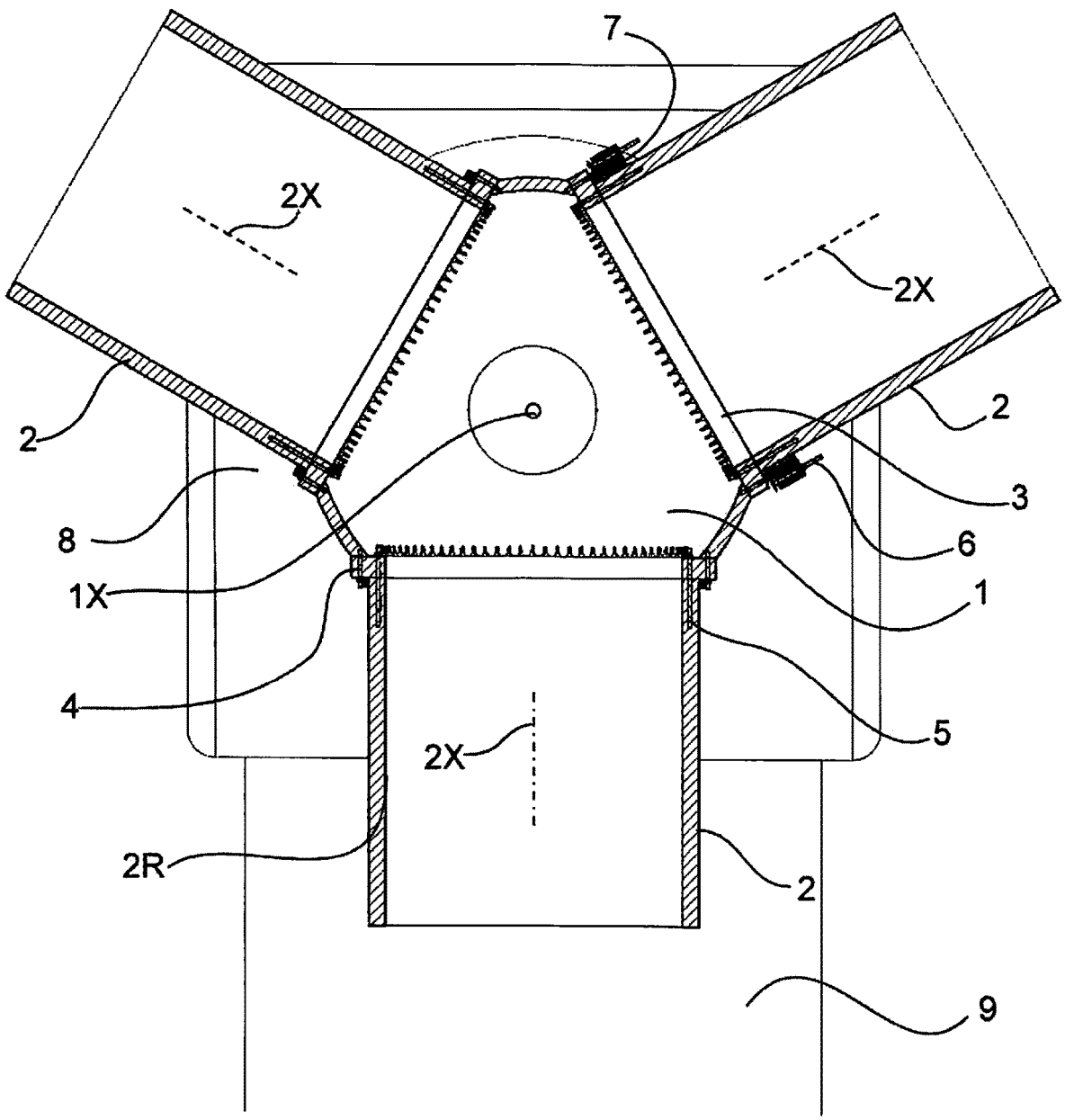
FIG. 1 is a front elevational view of the hub and three blades of a typical wind turbine assembly showing the blades, hub, blade bearings and the bolts or studs which connect the blade bearing to the hub and the blade to the bearing.
Figure 2:
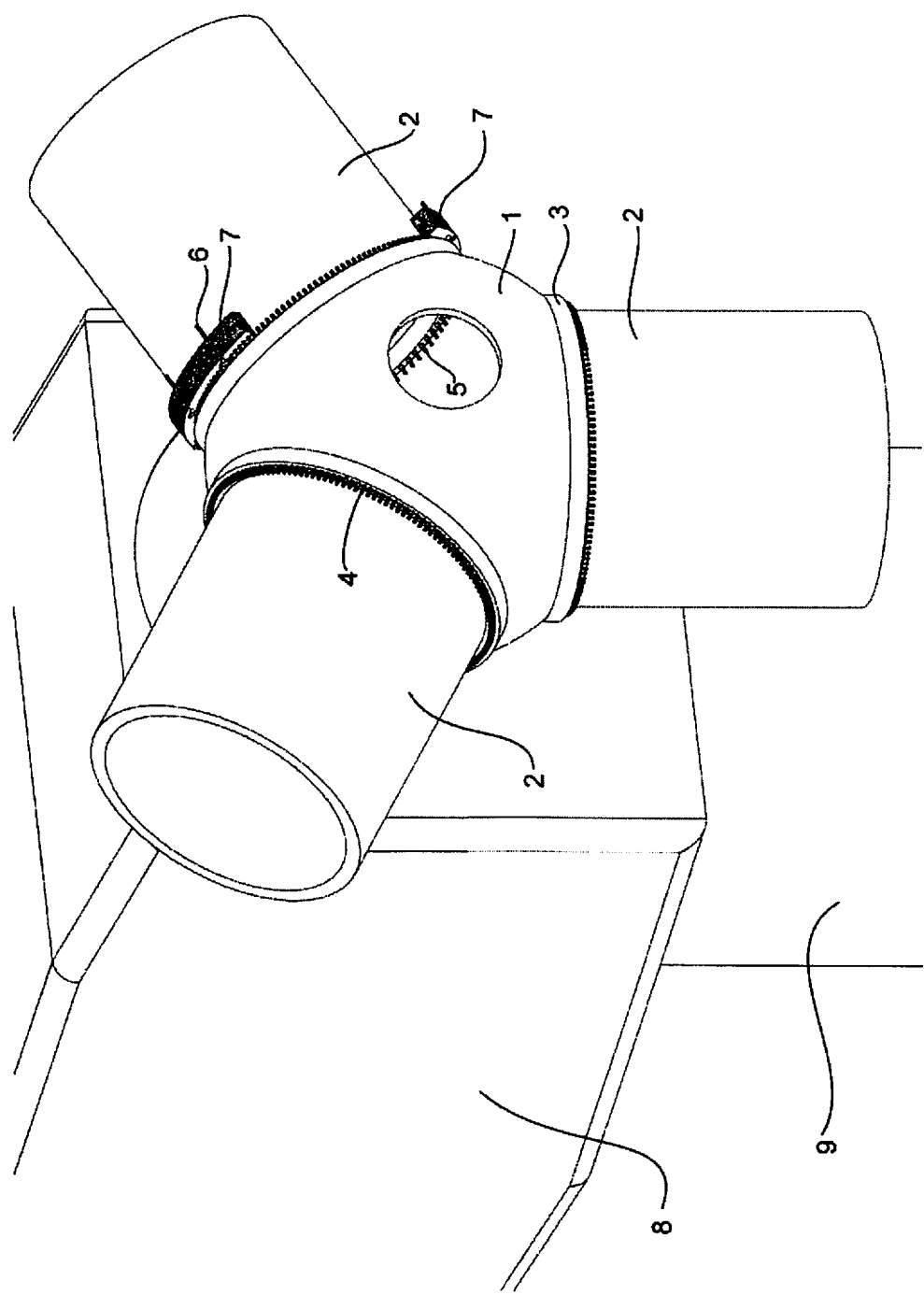
FIG. 2 is an isometric view of the assembly of FIG. 1 showing the prefabricated balancing weights of the present invention attached to the blade bearing, and the Hub body utilizing the "L" shaped bracket described hereinafter.

The assembly of a wind turbines rotor includes, as shown initially in FIG. 2, a nacelle 8 on which is mounted a rotor hub body 1 for rotation on the nacelle 8 about an axis 1X longitudinal of the hub body 1. On the hub body 1 is mounted typically three blades 2 at 120 degrees spacing which rotate around the hub axis and are driven by wind forces applied to the blades to generate electricity from a generator in the turbine through a transmission system not shown.

Each blade 2 is also mounted for pivotal movement about an axis 2X longitudinal of the blade relative to the hub to change pitch of the blade as required for different wind conditions.

It will be noted that only the blade root 2R is shown in the drawing. Also shown are the blade bearings 3, the studs 4 with nuts mounting the blade bearing 3 to the hub 1, and the studs 5 with nuts holding the blade 2 to the blade bearing 3.

Figure 7:
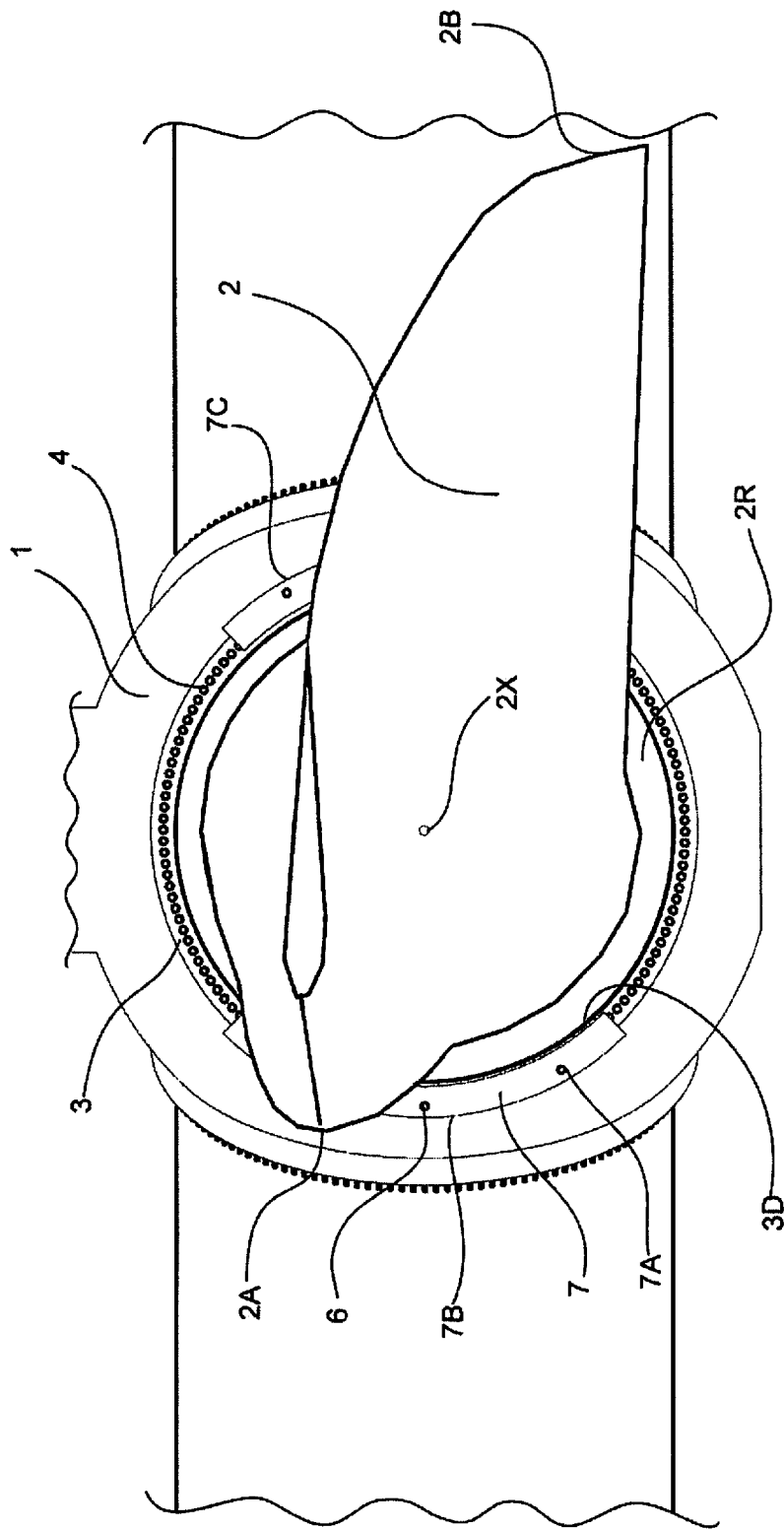
FIG. 7 is a view along the axis of the rotor showing the balancing weights mounted on the bearing and including a shape of the blade in cross-section applied onto the Figure to show the position of the weighs relative to the leading and trailing edges of the blade.
Figure 8:
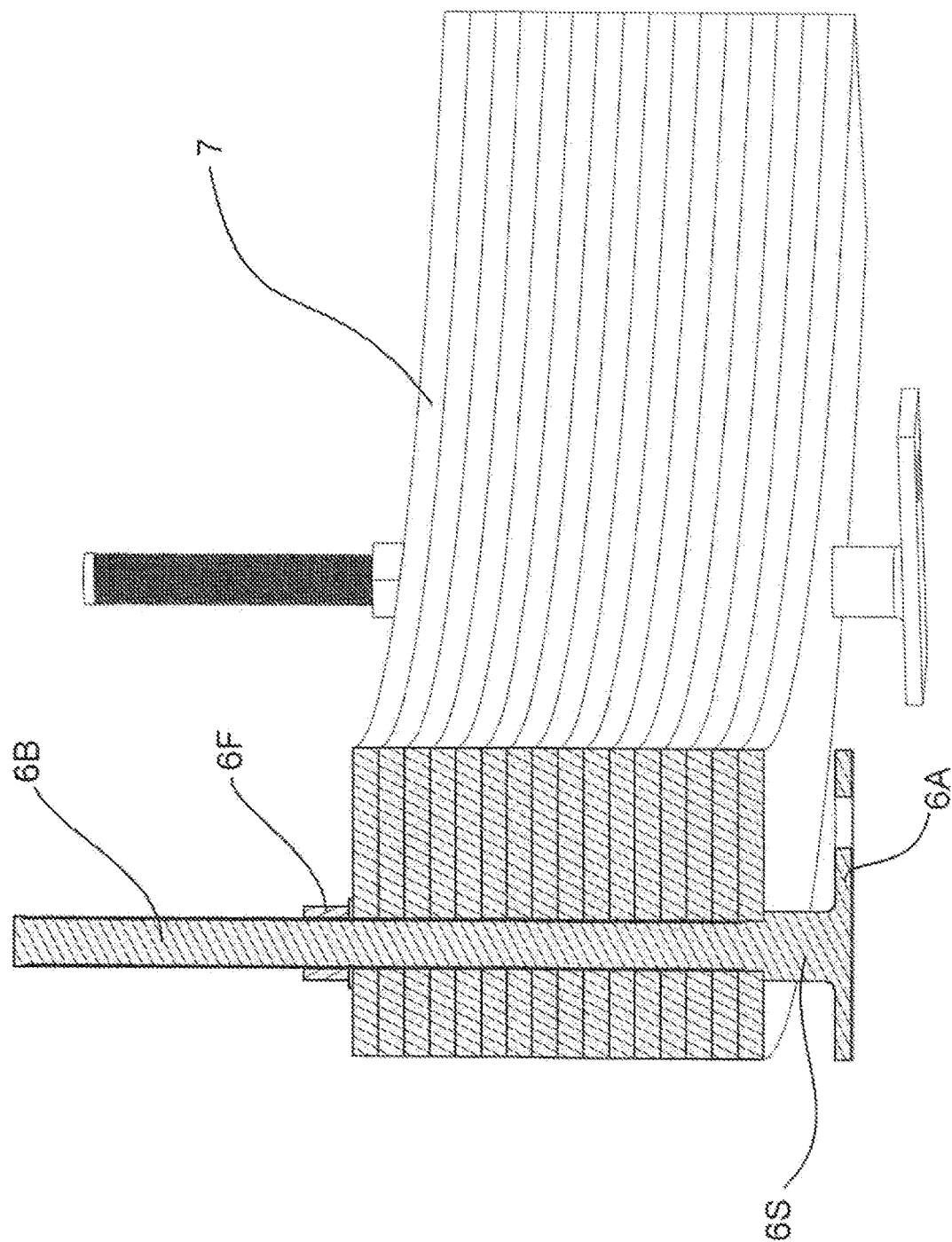
FIG. 8 is a an isometric view partly in section of the stack of weights mounted on the brackets.

Thus the blade bearing 3 as best shown in FIG. 7 includes an annular outer race 3A of the bearing and an annular inner race 3B inside the outer race where the races are coaxial and aligned with the inner race allowing pivotal movement of the blade relative to the rotor hub around a longitudinal axis 2X.

The outer race is fixed to the hub by a series of angularly spaced screw fasteners 4 passing through the outer race and with an end 4A screwed into a blind threaded hole 4B in the rotor hub 1. An upper end 4C of the fastener 4 thus projects upwardly from the upper face of the outer race and is clamped to the outer race by a nut 4D which leaves a portion of the upper end 4C exposed above the nut 4D.

The inner race 3B is fastened to the blade by fasteners 5 which have one end 5A formed into the annular base of the blade so that an outer end 5B of each fastener passes through the inner race 3B and is clamber thereto by a nut 5C.

The weights will be mounted as follows bearing gin mind that the design might vary depending on the size of the blade 2 and the hub 1.

In the method, an analysis is carried out using known methods to provide a detection of and an amount of an imbalance in the rotation of the rotor hub caused by unbalanced loads applied by the blades to the rotor hub. Methods for this analysis are well known in the art to a skilled person.

In response to this analysis the method provides the step of adding weight at one or more of the blades 2 selected to counter the imbalance.

The weight is added to said one or more blades by mounting a weight body to the blade at the blade bearing.

The weight body comprises a plurality of individual arcuate plate shaped weight elements 7 so that the number of weight elements can be selected and mounted as a stack to provide a total required weight. The weight elements include mounting holes 7A.

Figure 5:
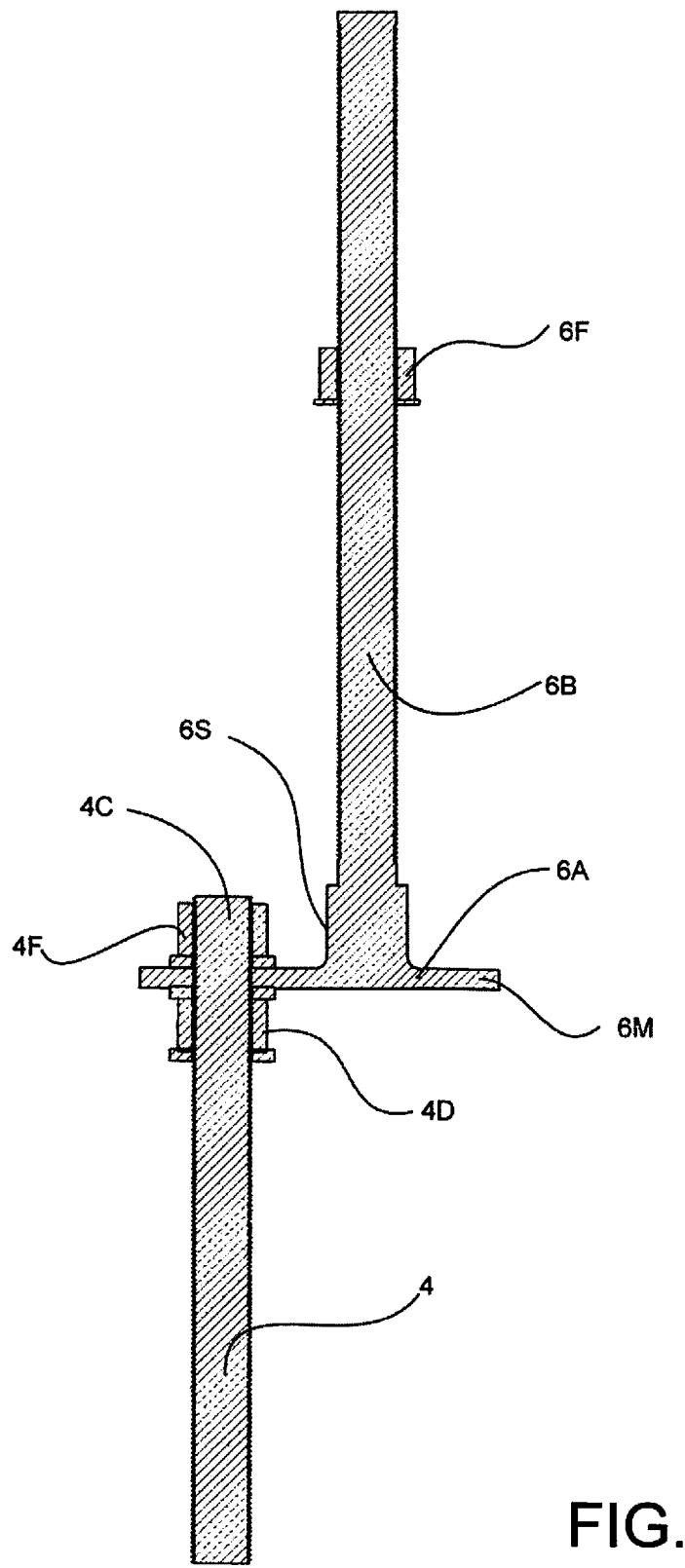
FIG. 5 is an elevation of one support bracket for mounting the balancing weights on the bolts.
Figure 6:
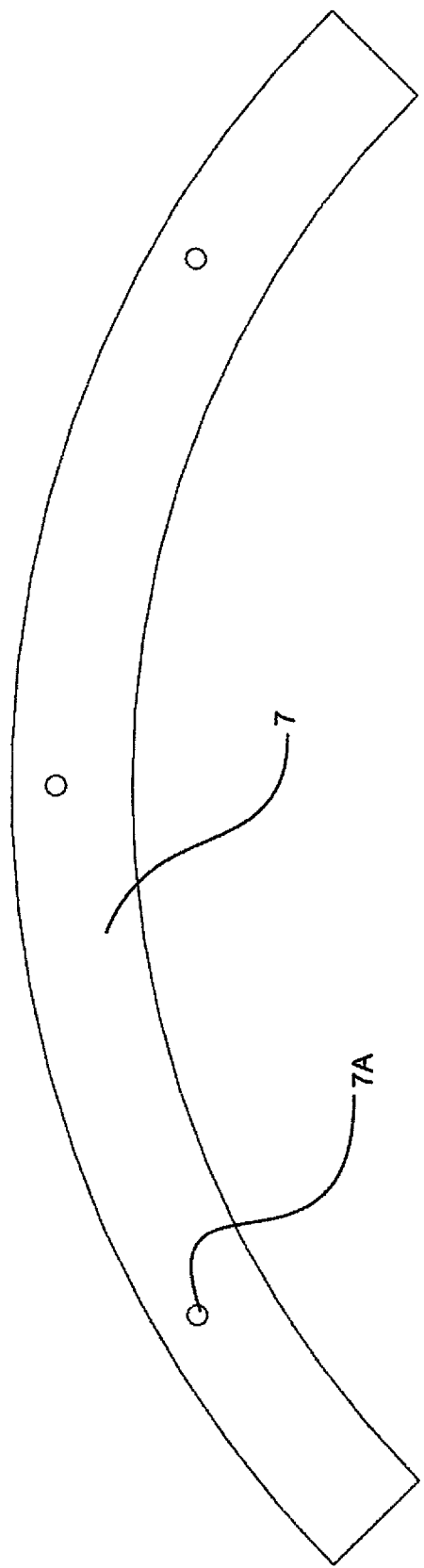
FIG. 6 is a plan view of one of the balancing weights.

The weight body is mounted on the outer race 3A of the bearing 3 by attachment to the plurality of screw fasteners 4 at the exposed outer end 4C above the nut 4D. In particular the weight body is mounted on the screw fasteners 4 by a plurality of L-shaped brackets 6, best shown in FIG. 5, each including a collar 6A engaged onto a selected one of the screw fasteners 4 and each including an engagement portion or post 6B for mounting the weight body 7 by receiving the respective hole 7A.

Figure 3:
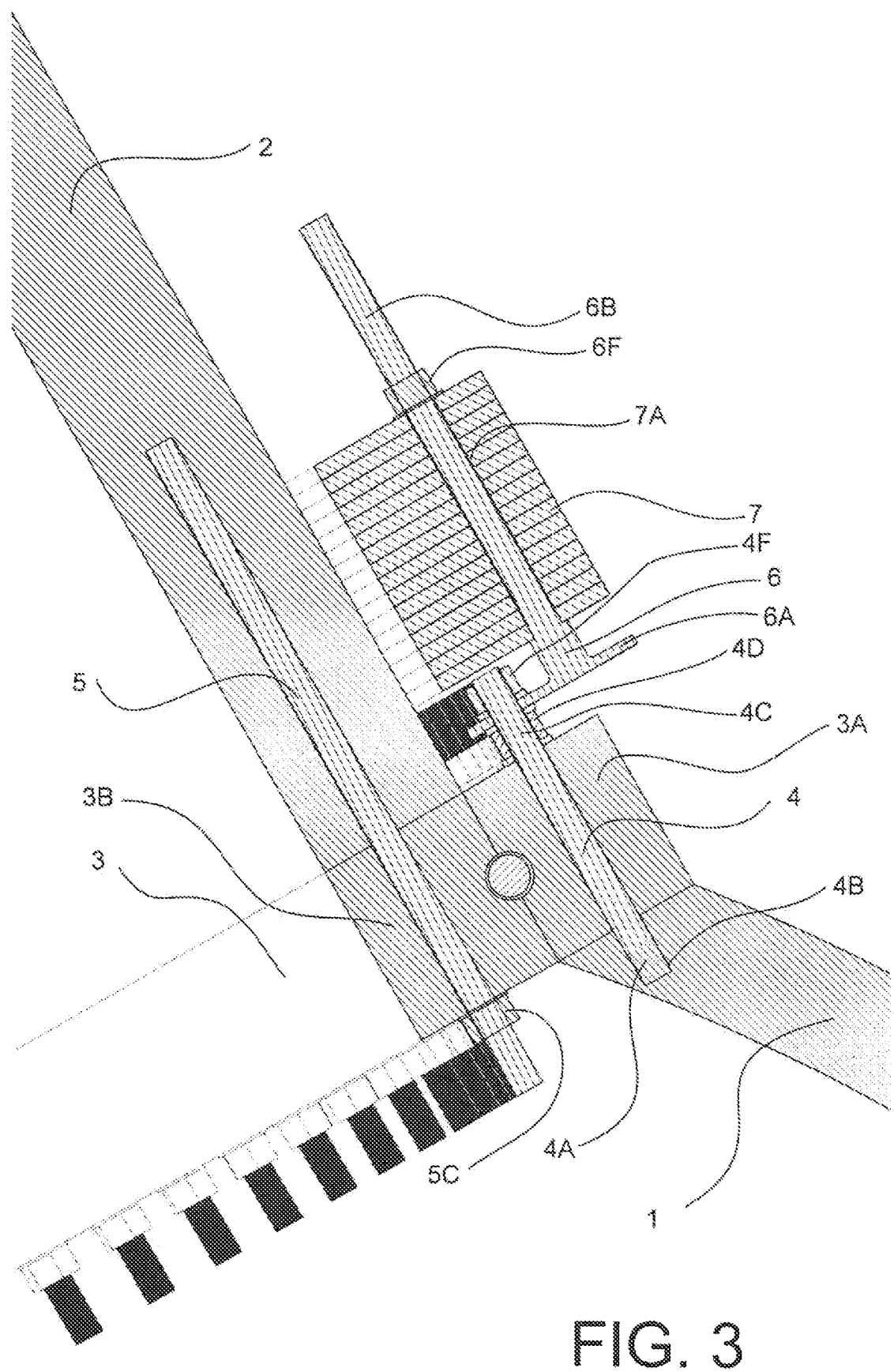
FIG. 3 is a cross-section of FIG. 1 showing the mounting of the balancing weights on the bolts of the bearing.
Figure 4:
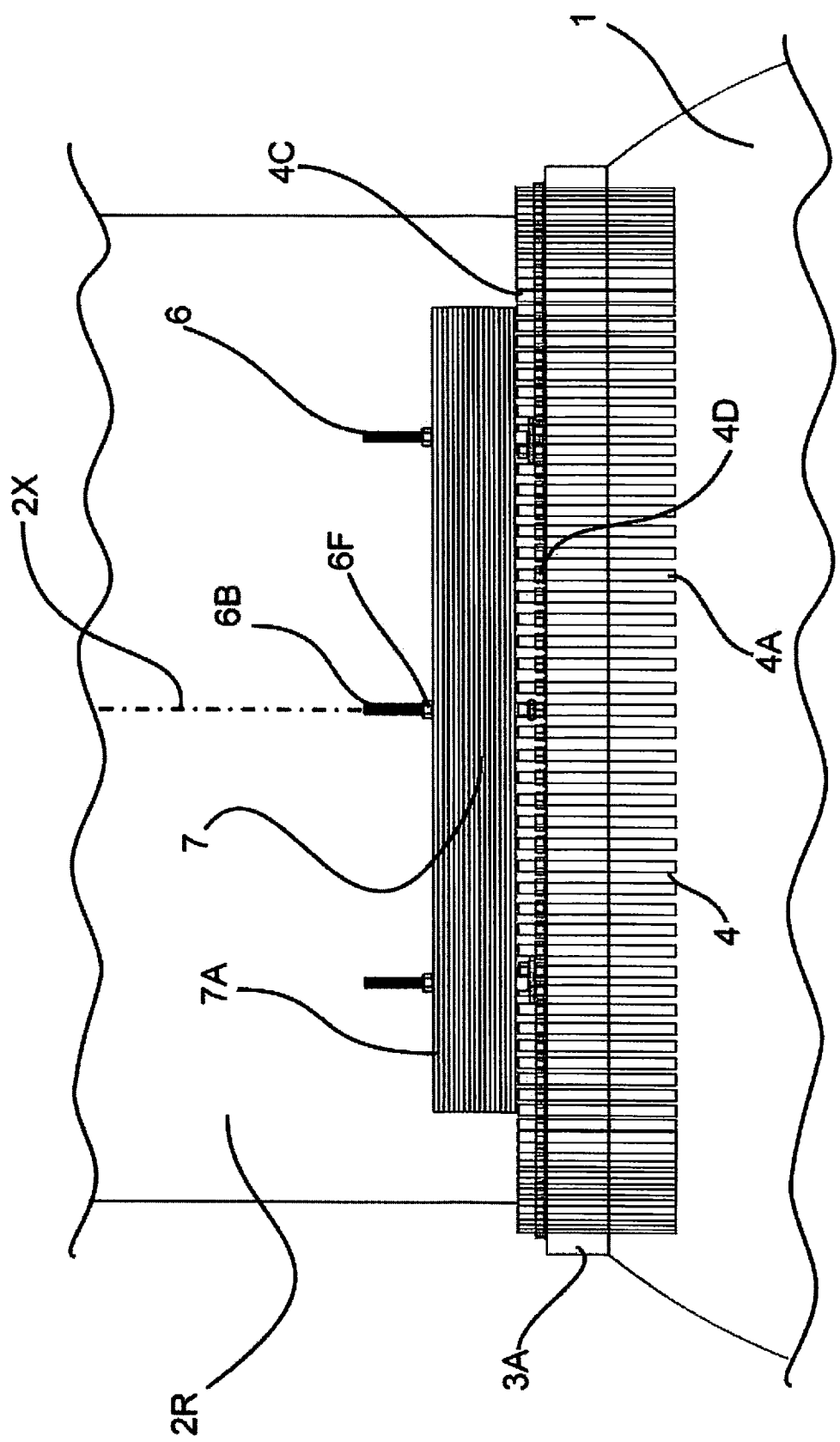
FIG. 4 is an elevational view of the arrangement of FIGS. 1 and 2 showing the balancing weight attached to the bolts.

Thus as best shown in FIG. 3, the engagement portions for mounting the weight body are located outward of the outer race and of the fasteners 4 as the collars 6A carry the posts 6B at the outward position to receive the plates 7 with the posts for mounting the weight body extend axially of the blade 2 parallel to the fasteners 4. For example as shown in FIG. 4, the body 7 is mounted on three posts 6B on selected ones of the fasteners 4. The mounting leaves the fasteners 4 unaffected so as not to interfere with the proper mounting of the outer race on the rotor hub.

As shown in FIG. 7 the weight body 7 extends around only part of the circumference of the blade leaving at least a part 3D of the circumference of the outer race and the blade bearing at the nacelle free from the weight body. This avoids any possibility of interfering engagement between the weight body and the nacelle or any other adjacent components as the blade 2 pivots.

In particular the weight body is formed in two separate components 7B, 7C each extending around only part of the circumference of the blade at the leading and trailing edges 2A, 2B of the blade so as to counterbalance at radially opposite locations around the axis 2X.

The base structure of the bracket 6 is an "L" shaped bracket consisting of a flat metal 6M with a hole large enough to be mounted on the excess bearing stud bolt 4 and secured with a nut 4F or necessary hardware. A stud 6S is mounted onto the flat metal, it can be bolted, welded or any other suitable method can be used. The stud 6S acts as a spacer to elevate the balancing weights 7 above the bearing stud bolts 4. The prefabricated balancing weights 7 will be slid onto the posts 6B on the bracket 6 and secured with a nut 6F.

The weights are typically mounted evenly on the leading edge 2A and the trailing edge 2B of the blade bearing relative to the blade in a "0" degree pitch orientation.

The number of "L" shaped brackets 6 will vary with the dimensions of the blade and blade bearing.

The prefabricated balancing weights 7 are typically comprised of 12.5 mm (½") steel but are not limited to this thickness.

The invention claimed is:

1. A method for balancing a wind turbine where the wind turbine comprises:
 a rotor hub mounted on a nacelle for rotation about a generally horizontal rotor axis;
 a plurality of blades mounted on the rotor hub for driving the rotation of the rotor hub about the rotor axis in response to wind impacting on the blades;

each blade being mounted on the rotor hub by an annular blade bearing which allows the blade to pivot about a longitudinal axis of the blade to change pitch of the blade as required for wind conditions;

the method comprising:

in response to a detection of an imbalance in the rotation of the rotor hub caused by unbalanced loads applied by the blades to the rotor hub, adding weight to the wind turbine at a selected one of the blades to counter the imbalance;

where the weight is added by mounting a weight body to the wind turbine at the blade bearing of said selected blade;

wherein the annular blade bearing includes a circular inner race surrounding the longitudinal axis of the selected blade and lying in a radial plane of the longitudinal axis and a circular outer race radially outward of and surrounding the inner race;

wherein the outer race is attached to the hub and the inner race is attached to the selected blade so as to pivot about said longitudinal axis with said selected blade;

and wherein the weight body is mounted on the outer race outwardly of the inner race and at least partly surrounding the inner race.

2. The method according to claim 1 wherein the weight body comprises a plurality of individual weight elements so that the number of weight elements can be selected to provide a total required weight.

3. The method according to claim 1 wherein the outer race of the annular blade bearing is connected to the hub by a plurality of screw fasteners and wherein the weight body is mounted on the screw fasteners.

4. The method according to claim 3 wherein the weight body is mounted on the screw fasteners by at least one bracket engaged onto selected ones of the screw fasteners and including an engagement portion for mounting the weight body.

5. The method according to claim 4 wherein said at least one bracket includes a plurality of posts onto which the weight body is engaged.

6. The method according to claim 5 wherein the weight body comprises a plurality of plates where each plate has a plurality of holes therein allowing one of the holes on the plates to slide onto a respective one of the posts to form a stack of plates.

7. The method according to claim 6 wherein the plurality of posts are located outward of the outer race.

8. The method according to claim 6 wherein the plurality of posts for mounting the weight body extend axially of the selected blade.

9. The method according to claim 1 wherein the weight body is arcuate so as to lie in a circle surrounding the rotor axis at a circumference of the selected blade and extends around only part of the circumference of the selected blade.

10. The method according to claim 9 wherein the weight body is formed in two separate components each extending around only part of the circumference of the selected blade at the leading and trailing edges of the selected blade.

11. A method for balancing a wind turbine where the wind turbine comprises:

a rotor hub mounted on a nacelle for rotation about a generally horizontal rotor axis;

a plurality of blades mounted on the rotor hub for driving the rotation of the rotor hub about the rotor axis in response to wind impacting on the blades;

each blade being mounted on the rotor hub by an annular blade bearing which allows the blade to pivot about a longitudinal axis of the blade to change pitch of the blade as required for wind conditions;

the method comprising:

in response to a detection of an imbalance in the rotation of the rotor hub caused by unbalanced loads applied by the blades to the rotor hub, adding weight to the wind turbine at a selected one of the blades to counter the imbalance;

where the weight is added by mounting a weight body to the wind turbine at the blade bearing of said selected blade;

wherein the annular blade bearing is connected to the hub by a plurality of screw fasteners;

wherein the weight body is mounted on the screw fasteners by at least one bracket engaged onto selected ones of the screw fasteners;

said at least one bracket carrying a plurality of posts extending along the selected blade parallel to the longitudinal axis;

wherein the weight body comprises a plurality of weight plates where each weight plate has a plurality of holes therein allowing each of the holes on the weight plates to slide onto respective one of the plurality of posts to form a stack of the weight plates.

12. A method for balancing a wind turbine where the wind turbine comprises:

a rotor hub mounted on a nacelle for rotation about a generally horizontal rotor axis;

a plurality of blades mounted on the rotor hub for driving the rotation of the rotor hub about the rotor axis in response to wind impacting on the blades;

each blade being mounted on the rotor hub by an annular blade bearing which allows the blade to pivot about a longitudinal axis of the blade to change pitch of the blade as required for wind conditions;

each blade having a leading edge and a trailing edge relative to a direction of rotation;

the method comprising:

in response to a detection of an imbalance in the rotation of the rotor hub caused by unbalanced loads applied by the blades to the rotor hub, adding weight to the wind turbine at a selected one of the blades to counter the imbalance;

where the weight is added by mounting a weight body to the wind turbine at the annular blade bearing of said selected blade;

wherein the annular blade bearing surrounds the longitudinal axis and lies in a radial plane of the longitudinal axis;

wherein the weight body comprises first and second components each of which is arcuate so as to lie in a circle surrounding the rotor axis of said selected blade at a circumference of said selected blade;

wherein each arcuate weight body extends around only a respective part of the circumference of the selected blade;

wherein the first component is located at or adjacent the leading edge of the selected blade; and wherein the second component is located at or adjacent the trailing edge of the selected blade.

13. The method according to claim 12 wherein each weight body comprises a plurality of individual weight elements so that the number of weight elements can be selected to provide a total required weight.

14. The method according to claim 12 wherein the annular blade bearing includes an outer race which is connected to the hub by a plurality of screw fasteners and wherein the weight body is mounted on the screw fasteners.

15. The method according to claim 14 wherein the weight body is mounted on the screw fasteners by at least one bracket engaged onto selected ones of the screw fasteners and including an engagement portion for mounting the weight body.

16. The method according to claim 15 wherein said at least one bracket includes a plurality of posts onto which the weight body is engaged.

17. The method according to claim 16 wherein the weight body comprises a plurality of plates where each plate has a plurality of holes therein allowing one of the holes on the plates to slide onto a respective one of the posts to form a stack of plates.

18. The method according to claim 16 wherein the plurality of posts for mounting the weight body extend axially of the selected blade.

\* \* \* \* \*